(12) United States Patent
Tang (10) Patent No.: US 11,968,583 B2
(45) Date of Patent: *Apr. 23, 2024

(54) DATA PROCESSING METHOD, DEVICE AND STORAGE MEDIUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 82 days.

This patent is subject to a terminal disclaimer.

(21) Appl. No.: 17/692,759

(22) Filed: Mar. 11, 2022

(65) Prior Publication Data

US 2022/0201579 A1 Jun. 23, 2022

Related U.S. Application Data

(63) Continuation of application No. 17/322,683, filed on May 17, 2021, now Pat. No. 11,323,939, which is a (Continued)

(51) Int. Cl.
*H04W 4/00* (2018.01)
*H04W 8/24* (2009.01)
*H04W 36/14* (2009.01)

(52) U.S. Cl.
CPC ............ *H04W 36/14* (2013.01); *H04W 8/24* (2013.01)

(58) Field of Classification Search
CPC ................................ H04W 36/14; H04W 8/24
(Continued)

(56) References Cited

U.S. PATENT DOCUMENTS

2007/0049273 A1  3/2007  Proctor et al.
2016/0028533 A1  1/2016  Kazmi et al.
(Continued)

FOREIGN PATENT DOCUMENTS

CN   101193413 A   6/2008
CN   101300865 A   11/2008
(Continued)

OTHER PUBLICATIONS

Decision of Refusal for Japanese Application No. 2021-528460 dated Dec. 9, 2022. 4 pages with English translation.
(Continued)

*Primary Examiner* — Marcos Batista
(74) *Attorney, Agent, or Firm* — Perkins Coie LLP (57) ABSTRACT

A data processing method, comprising: a terminal device (120) reports switching time capability to a network device (110), the switching time capability being used for data scheduling of the network device (110) to the terminal device (120). The switching time capability comprises: the switching time that the terminal device (120) is switched from a first network to a second network, and/or the switching time that the terminal device (120) is switched from the second network to the first network. The network device (110) comprises a first network device and/or a second network device. Also disclosed are another data processing method, a terminal device, a network device and a storage medium.

14 Claims, 7 Drawing Sheets

Related U.S. Application Data continuation of application No. PCT/CN2018/117538, filed on Nov. 26, 2018.

(58) Field of Classification Search
USPC .......................................... 370/331; 455/312
See application file for complete search history.

(56) References Cited

U.S. PATENT DOCUMENTS

| | | | | |
|---|---|---|---|---|
| 2016/0205604 | A1* | 7/2016 | Kang | H04W 36/0072 370/331 |
| 2017/0279715 | A1 | 9/2017 | Li | |
| 2019/0268814 | A1* | 8/2019 | Hannu | H04W 36/0069 |

FOREIGN PATENT DOCUMENTS

| | | |
|---|---|---|
| CN | 102106171 A | 6/2011 |
| CN | 103109565 A | 5/2013 |
| CN | 103945467 A | 7/2014 |
| CN | 105284155 A | 1/2016 |
| CN | 108810965 A | 11/2018 |
| JP | 2016171521 A | 9/2016 |
| KR | 20150024131 A | 3/2015 |
| RU | 2479947 C2 | 4/2013 |
| WO | 2016133123 A1 | 8/2016 |
| WO | 2018088943 A1 | 5/2018 |

OTHER PUBLICATIONS

First Office Action for Chinese Application No. 202110771016.2 dated Sep. 19, 2022. 16 pages with English translation.
Kumar, A. et al. "Network on Chip for DTMF Decoder and TDM Switching in Telecommunication Network with HDL Environment" 3rd IEEE IACC, 2013, pp. 1582-1588.
Qualcomm "Draft CR to TS 38.101-3: Implementation of endorsed draft CRs from RAN4 #87" R4-1808532; 3GPP TSG RAN WG4 Meeting #87; Busan, Korea; May 21-25, 2018. 160 pages.
Zao, L. "Research on Radio Resource Management in Heterogeneous Network" Masters Thesis, Beijing University of Posts and Telecommunications, Nov. 30, 2015. 74 pages with English abstract.
Examination Report of the European application No. 18941187.9, dated Aug. 10, 2022. 6 pages.
First Examiner's Report of the Canadian application No. 3,120,779, dated Aug. 11, 2022. 4 pages.
First Office Action of the Japanese application No. 2021-528460, dated Jun. 3, 2022. 10 pages with English Translation.
3GPP "Evolved Universal Terrestrial Radio Access (E-UTRA) and NR; Multi-connectivity; State 2 (Release 15)" 3GPP TS 37.340 V15.3.0 (Sep. 2018). 59 pages.
3GPP "User Equipment radio transmission adn reception; Part 3: Range 1 and Range 2 Interworking operation with other radios (Release 15)" 3GPP TS 38.101-3 V15.3.0 (Sep. 2018). 196 pages.
3GPP TSG RAN WG1 Meeting #88bis—R1-1704179—Spokane, USA, Apr. 3-7, 2017—3GPP TSG-RAN WG4 Meeting #82—R4-1702029—Athens, Greece, Feb. 13-17, 2017—RAN WG4, Reply LS on UE RF Bandwidth Adaptation in NR (2 pages).
Extended European Search Report for European Application No. 18941187.9 dated Nov. 11, 2021. 11 pages.
First Office Action for Russian Application No. 2021116562 dated Nov. 30, 2021. 18 pages with English translation.
First Office Action dated Feb. 23, 2022 in India Application No. 202117022063; 5 pages.
International Search Report dated Aug. 27, 2019 of PCT/CN2018/117538 (4 pages).
Notification of Reason for Refusal for Korean Application No. 10-2021-7017334 dated Dec. 22, 2021. 8 pages with English translation.
Oppo "Draft CR on output power dynamic for DC" R4-1816231; 3GPP TSF-RAN WG4 Meeting #89; Spokane, USA, Nov. 12-16, 2018. 4 pages.
Examination Report No. 1 for Australian Application No. 2018450891 dated Mar. 11, 2022. 4 pages.
Corrected Notice of Allowability dated Feb. 14, 2022 of U.S. Appl. No. 17/322,683, filed May 17, 2021.4 pages.
Corrected Notice of Allowability dated Mar. 31, 2022 of U.S. Appl. No. 17/322,683, filed May 17, 2021. 3 pages.
Non-Final Office Action dated Jul. 23, 2021 of U.S. Appl. No. 17/322,683, filed May 17, 2021. 16 pages.
Notice of Allowance dated Nov. 23, 2021 of U.S. Appl. No. 17/322,683, filed May 17, 2021. 8 pages.
Examination Report for European Application No. 18941187.9 dated Feb. 1, 2023. 5 pages.
Written Opinion for Singaporean Application No. 11202105331P dated Apr. 17, 2023. 10 pages.

* cited by examiner

DATA PROCESSING METHOD, DEVICE AND STORAGE MEDIUM

CROSS-REFERENCE TO RELATED APPLICATION

This application is a continuation application of U.S. application Ser. No. 17/322,683 filed on May 17, 2021, which is a continuation application of International PCT Application No. PCT/CN2018/117538 filed on Nov. 26, 2018, the entire content of both are hereby incorporated by reference.

TECHNICAL FIELD

The present disclosure relates to a technical field of wireless communication, in particular to a data processing method, a device and a storage medium.

BACKGROUND

In related arts, two types of switching time capabilities are defined for a Dual-Connectivity from Evolved Universal Terrestrial Radio Access (E-UTRA) to New Radio (NR), abbreviated as en-DC for short, and a DC from the NR to the E-UTRA, abbreviated as ne-DC. A switching time corresponding to a first type (Type1) of switching time capability is less than 0.5 μs, and a switching time corresponding to a second type (Type2) of switching time capability is less than 20 μs.

Apparently, the two types of switch time capabilities defined in the related arts cannot cover all scenarios, leading to a fact that a network device is unable to implement an effective scheduling of a terminal device.

SUMMARY

Implementations of the present disclosure provide a data processing method, a device and a storage medium.

In a first aspect, an implementation of the present disclosure provides a data processing method, including: reporting, by a terminal device, a switching time capability to a network device, wherein the switching time capability is used for the network device to perform a data scheduling on the terminal device, the switching time capability includes a switching time from a first network to a second network for the terminal device, and/or a switching time from the second network to the first network for the terminal device, and the network device includes a first network device and/or a second network device.

In the second aspect, an implementation of the present disclosure provides a data processing method, including: receiving, by a network device, a switching time capability sent by a terminal device, wherein the switching time capability is used for the network device to perform a data scheduling on the terminal device, and the switching time capability includes a switching time from a first network to a second network for the terminal device, and/or a switching time from the second network to the first network for the terminal device.

In a third aspect, an implementation of the present disclosure provides a data processing method, including: processing, by a terminal device, data based on a correspondence between a switching time and a data scheduling mode, wherein the processing of the data includes transmitting the data within the switching time or not transmitting the data within the switching time.

In a fourth aspect, an implementation of the present disclosure provides a terminal device, including: a first sending unit, configured to report a switching time capability to a network device, wherein the switching time capability is used for the network device to perform a data scheduling on the terminal device, and the switching time capability includes a switching time from a first network to a second network for the terminal device, and/or a switching time from the second network to the first network for the terminal device.

In a fifth aspect, an implementation of the present disclosure provides a network device, including: a third receiving unit, configured to receive a switching time capability sent by a terminal device, wherein the switching time capability is used for the network device to perform a data scheduling on the terminal device, and the switching time capability includes a switching time from a first network to a second network for the terminal device, and/or a switching time from the second network to the first network for the terminal device.

In a sixth aspect, an implementation of the present disclosure provides a terminal device, including: a third processing unit, configured to process data based on a correspondence between a switching time and a data scheduling mode, wherein the processing of the data includes transmitting the data within the switching time or not transmitting the data within the switching time.

In a seventh aspect, an implementation of the present disclosure provides a terminal device, including: a processor and a memory configured to store a computer program runnable on the processor, wherein the processor is configured to execute acts of the above data processing methods executed by the terminal device when running the computer program.

In an eighth aspect, an implementation of the present disclosure provides a network device, including: a processor and a memory configured to store a computer program runnable on the processor, wherein the processor is configured to execute acts of the above data processing methods executed by the network device when running the computer program.

In a ninth aspect, an implementation of the present disclosure provides a storage medium, in which an executable program is stored, wherein when the executable program is executed by a processor, one of the above data processing methods executed by the terminal device is implemented.

In a tenth aspect, an implementation of the present disclosure provides a storage medium, in which an executable program is stored, wherein when the executable program is executed by a processor, one of the above data processing methods executed by the network device is implemented.

DETAILED DESCRIPTION

In order to understand features and technical contents of implementations of the present disclosure in more detail, implementation modes of implementations of the present disclosure will be described in detail below with reference to accompanying drawings. The accompanying drawings are used for reference only and are not intended to limit implementations of the present disclosure.

Before implementations of the present disclosure are described in detail, a brief description of a switching time will be made first.

At present, an LTE-NR Up Line (UL) switching time in 3GPP Rel (Release)-15 mainly covers several scenarios such as in-band continuous EN-DC, in-band discontinuous EN-DC and UL sharing from UE perspective which support single UL switch and Time Division Multiplexing (TDM) transmission mode. A definition of a switching time is for meeting a demand of a switching time caused by a switching of a communication mode and corresponding frequency hopping in a same frequency range (in band), such as from Long Term Evolution (LTE) to NR, or from NR to LTE, which requires an adjustment of a baseband or a radio frequency, and is also called E-UTRA and NR switching time mask, or Output power dynamics for DC.

Figure 1A:
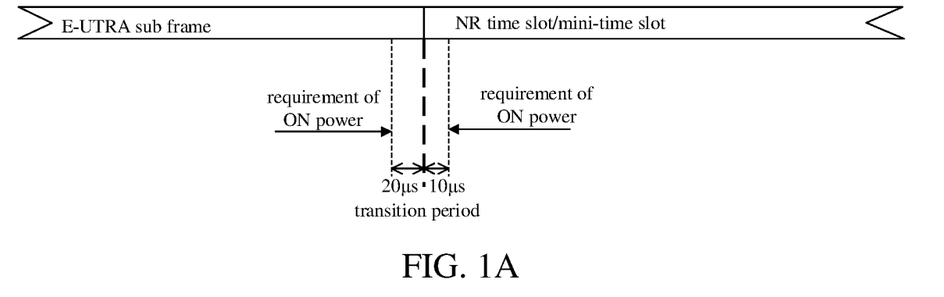
FIG. 1A is a schematic diagram of a transmission behavior of a terminal device when a switching time is Type1 provided by an implementation of the present disclosure.
Figure 1B:
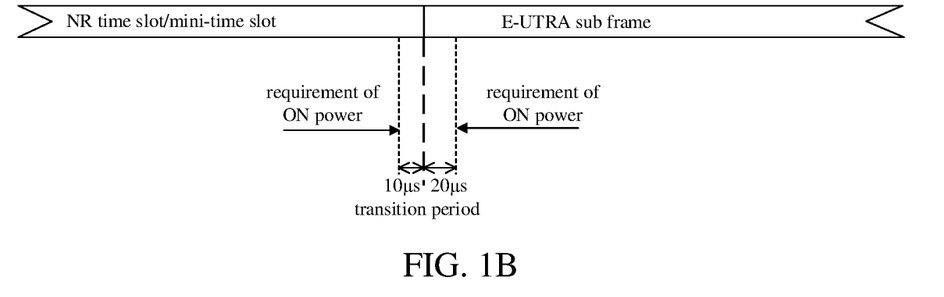
FIG. 1B is a schematic diagram of another transmission behavior of a terminal device when a switching time is Type1 provided by an implementation of the present disclosure.
Figure 1C:
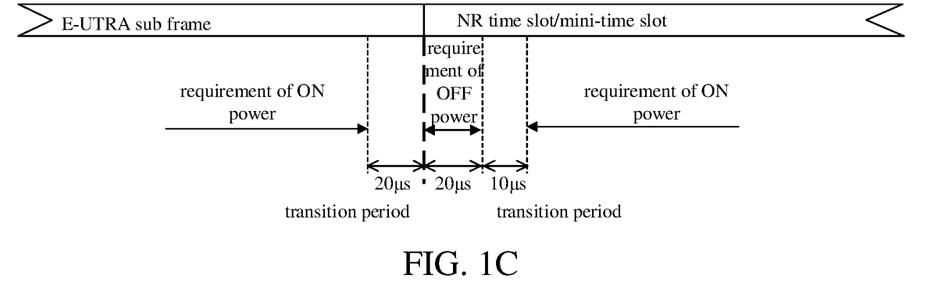
FIG. 1C is a schematic diagram of a transmission behavior of a terminal device when a switching time is Type2 provided by an implementation of the present disclosure.
Figure 1D:
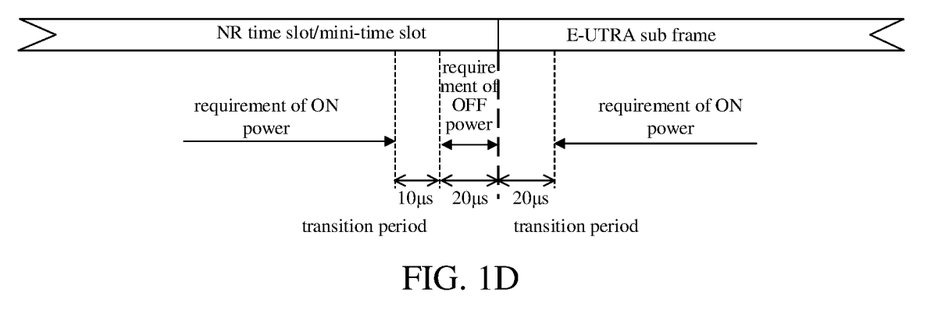
FIG. 1D is a schematic diagram of another transmission behavior of a terminal device when a switching time is Type2 provided by an implementation of the present disclosure.

Type1 switching time capability and Type2 switching time capability in the related arts are applicable to an in-band continuous EN-DC (case A) and a TDM based UL sharing from UE perspective (case B). In case A and case B, when the switching time pertains to Type1, as shown in FIG. 1A and FIG. 1B, the switching time is not needed, which may be understood as merging the switching time into a transition period. In case A and case B, when the switching time pertains to Type2, as shown in FIG. 1C and FIG. 1D, no data transmission is performed within the switching time, that is, a terminal device and a network device are in an OFF power requirement state within the switching time.

It may be seen that the switching time capability is determined based on a frequency band combination currently supported by the terminal device and on a position of a central frequency point during a switching, and pertains to inherent software and hardware capabilities of the terminal device in a current scenario. However, Type1 and Type2 in the related arts may not cover all scenarios. For example, the in-band continuous EN-DC (Case A) may have a longer switching time (>20 µs). Moreover, the switching time of the in-band discontinuous EN-DC is as long as 120 µs, which obviously cannot be covered by the existing Type1 and Type2.

Figure 1E:
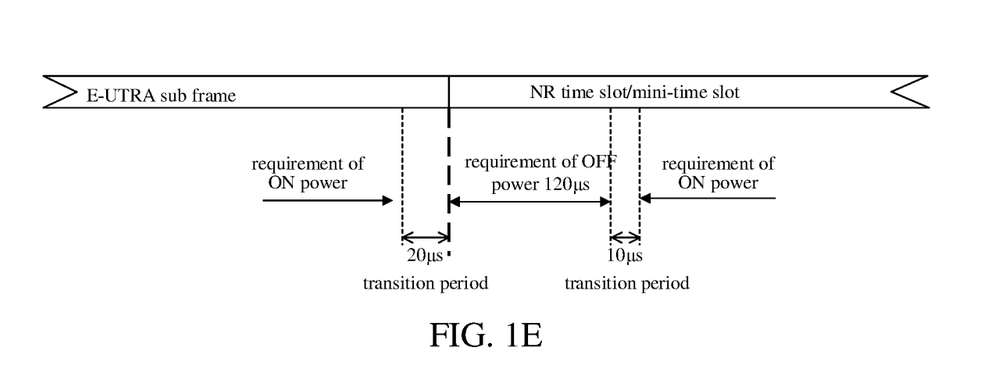
FIG. 1E is a schematic diagram of a transmission behavior of a terminal device when a switching time is long provided by an implementation of the present disclosure.
Figure 1F:
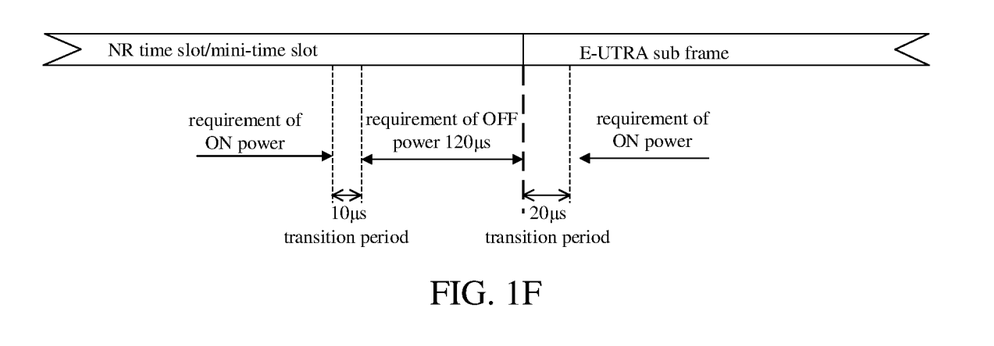
FIG. 1F is a schematic diagram of another transmission behavior of a terminal device when a switching time is long provided by an implementation of the present disclosure.

As shown in FIG. 1E and FIG. 1F, in related arts, for a long switching time, whether the terminal device switches from NR to LTE or from LTE to NR, the switching time is added to a slot or a mini-time slot of NR, and a requirement of OFF power is met, that is, no data is transmitted within the switching time. In such way, not only time domain positions of the switching time are not sufficiently flexible, while in a scenario with a large SCS, a symbol is short and the switching time is long. Thus if the data is not transmitted within the switching time, an opportunity of opportunistic transmission will be lost, which leads to a reduced performance of NR.

Based on above problems, there is provided a data processing method in the present application. A data processing method of implementations of the present application may be applied to various communication systems, such as, a Global System of Mobile communication (GSM) system, a Code Division Multiple Access (CDMA) system, a Wideband Code Division Multiple Access (WCDMA) system, a General Packet Radio Service (GPRS) system, an LTE system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, a 5G system, or the like.

Figure 2:
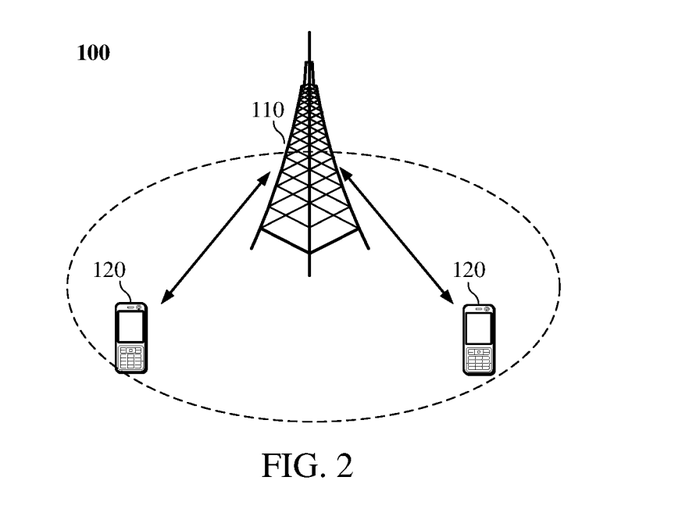
FIG. 2 is a structural schematic diagram of a communication system of an implementation of the present disclosure.

Illustratively, a communication system 100 applied in an implementation of the present application is shown in FIG. 2. The communication system 100 may include a network device 110, wherein the network device 110 may be a device that communicates with a terminal device 120 (or called as a communication terminal, or a terminal). The network device 110 may provide a communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN). Or, the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within a coverage range of the network device 110. The "terminal device" used herein includes, but is not limited to, being connected via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, and an AM-FM broadcast transmitter; and/or an apparatus of another terminal device, configured to receive/send a communication signal; and/or an Internet of Things (IoT) device. A terminal device configured to communicate via a wireless interface may be called as a "wireless communication terminal", a "wireless terminal" or a "mobile terminal". Examples of the mobile terminal include, but are not limited to, a satellite or cellular telephone, a Personal Communication System (PCS) terminal capable of combining a cellular wireless telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, etc.

Optionally, Device to Device (D2D) communication may be performed between the terminal devices 120.

Optionally, a 5G system or the 5G network may be called as a New Radio (NR) system or a NR network.

FIG. 2 illustratively shows one network device and two terminal devices. Optionally, a communication system 100 may include multiple network devices and other quantity of terminal devices may be included within a coverage range of each network device, but implementations of the present application are not limited thereto.

Optionally, the communication system 100 may include other network entities such as a network controller, and a mobile management entity, etc. Implementations of the present application are not limited thereto.

It should be understood that, a device with a communication function in a network/system in implementations of the present application may be called as a communication device. Taking the communication system 100 shown in FIG. 2 as an example, the communication device may include a network device 110 and a terminal device 120 which have communication functions, and the network device 110 and the terminal device 120 may be the specific devices described above, which will not be described here again. The communication device may also include other devices in the communication system 100, such as network controllers, mobile management entities, and other network entities, etc, but implementations of the present application are not limited thereto.

Figure 3:
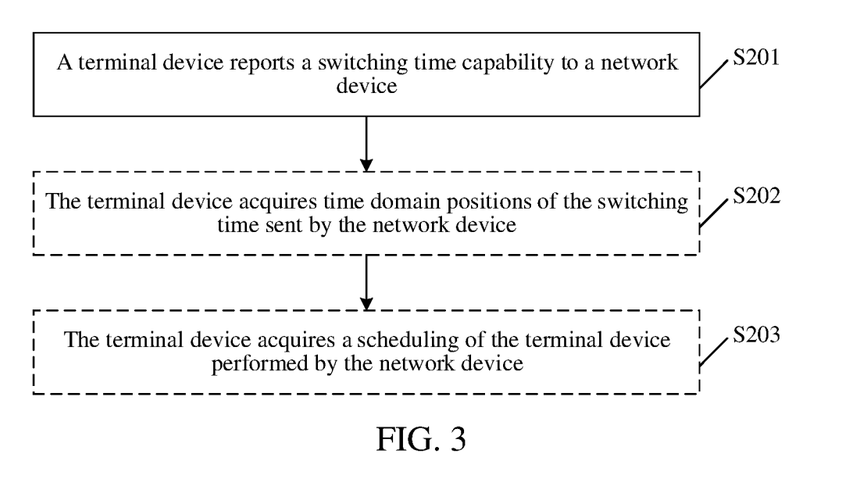
FIG. 3 is a schematic diagram of an optional processing flow of a data processing method applied to a terminal device provided by an implementation of the present disclosure.

As shown in FIG. 3, an optional processing flow of a data processing method applied to a terminal device provided by implementations of the present disclosure includes following acts:

Act S201, a terminal device reports a switching time capability to a network device.

Here, the switching time capability includes a switching time from a first network to a second network for the terminal device and/or a switching time from the second network to the first network for the terminal device. The network device includes a first network device and/or a second network device.

In an optional implementation, a switching time set includes at least two switching times, wherein each switching time corresponds to one switching time capability, and the terminal device reports to the network device an identifier in the switching time set corresponding to the switching time. Optionally, the switching time set is an increasing sequence. For example, the switching time set is {0 μs, 5 μs, 10 μs, 20 μs, 40 μs, 80 μs, 120 μs, 160 μs, 200 μs}, and sequence numbers corresponding to each switching time in the switching time set are 1, 2, 3, 4, 5, 6, 7, 8, 9 respectively. Therefore, when the switching time corresponding to the switching time capability is 40 μs, a sequence number 5 corresponding to 40 μs in the switching time set is reported to the network device by the terminal device.

In another implementation, the terminal device sends indication information of switching time capability type to the network device, wherein a bit value of the indication information of switching time capability type is used for representing a type of switching time capability. For example, the indication information of switching time capability type has 2 bits, when the bit value of the indication information of switching time capability type is 00, the switching time capability type represents a first type of switching time capability. When the bit value of the indication information of switching time capability type is 01, the switching time capability type represents a second type of switching time capability. When the bit value of the indication information of switching time capability type is 10, the switching time capability type represents a third type of switching time capability. When the bit value of the indication information of switching time capability type is 11, the switching time capability type represents a fourth type of switching time capability. Here, the switching time capability types include: the first type of switching time capability, the second type of switching time capability, the third type of switching time capability and the fourth type of switching time capability. In the above, a maximum switching time corresponding to the first type of switching time capability is less than a first threshold, a maximum switching time corresponding to the second type of switching time capability is less than a second threshold, a maximum switching time corresponding to the third type of switching time capability is less than a third threshold, a maximum switching time corresponding to the fourth class switching time capability is greater than a third threshold, wherein the first threshold is 0.5 µs, the second threshold is 20 µs, and the third threshold is 120 µs. It may be understood that, in an implementation of the present disclosure, the first type of switching time capability corresponds to the Type1 switching time capability in the related arts, and the second type of switching time capability corresponds to the Type2 switching time capability in the related arts.

In another optional implementation, the terminal device directly sends the switching time to the network device. For example, when the switching time is 20 µs, the switching time capability reported by the terminal device to the network device is 20 µs.

It should be noted that the terminal device in implementations of the present disclosure is a terminal device supporting DC. For example, the terminal device is a terminal device supporting an EN-DC combination, or the terminal device is a terminal device supporting a NE-DC combination. An anchor network device corresponding to EN-DC is a network device in the LTE network, and an anchor network device corresponding to NE-DC is a network device in the NR network.

Since the terminal device supports a dual connection state, there are two corresponding network devices, which correspond to the first network and the second network respectively. Taking an example in which the first network is a LTE network and the second network is a NR network, in a scenario of EN-DC, when the terminal device judges according to its own switching time capability, that it needs to send the switching time capability to the first network, the terminal device sends the switching time capability to a first network device corresponding to the first network. In a NE-DC scenario, when the terminal device judges, according to its own switching time capability, that it needs to send the switching time capability to the second network, the terminal device sends the switching time capability to a second network device corresponding to the second network. In some scenarios, the terminal device sends its own switching capability to the first network device corresponding to the first network and the second network device corresponding to the second network respectively.

In an implementation of the present disclosure, the switching time capability reported by the terminal device may directly correspond to a size of the switching time. Compared with that the terminal device reports the switching time capability type (Type1 or Type2) in the related arts, the switching time can be shorten and a scheduling efficiency and flexibility of the network device can be improved.

In some implementations, after execution of act S201, the method further includes: Act S202, the terminal device acquires time domain positions of a switching time sent by the network device.

Figure 4A:
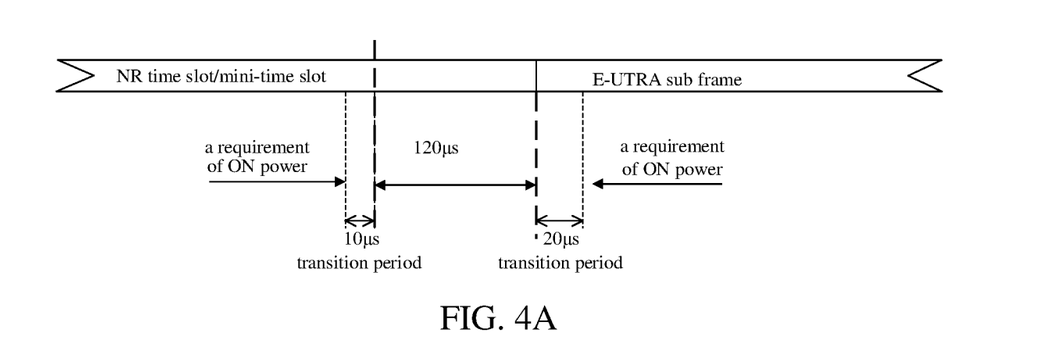
FIG. 4A is a schematic diagram of time domain positions of a switching time provided by an implementation of the present disclosure.

In some implementations, as shown in FIG. 4A, the time domain positions of the switching time are all located in the first network. For example, for the NE-DC scenario, each switching time is located in the LTE network.

Figure 4B:
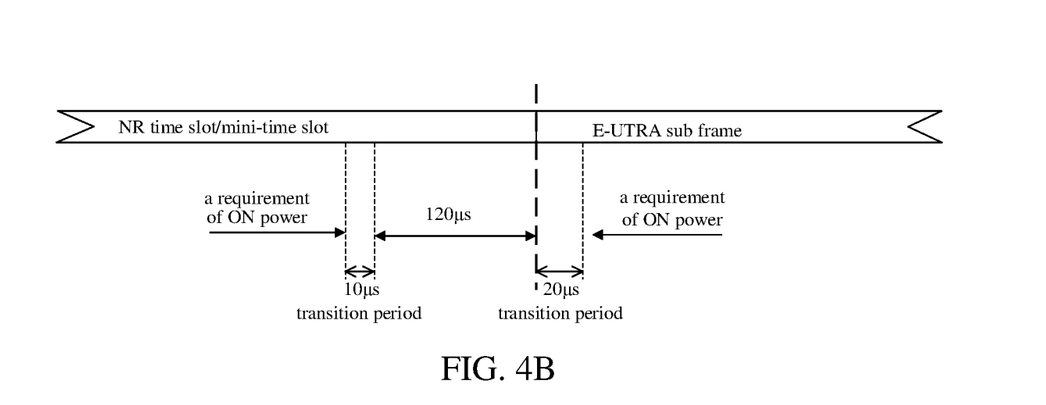
FIG. 4B is a schematic diagram of time domain positions of another switching time provided by an implementation of the present disclosure.

In other implementations, as shown in FIG. 4B, the time domain positions of the switching time are all located in the second network. For example, for the EN-DC scenario, each switching time is located in the LTE network.

Figure 4C:
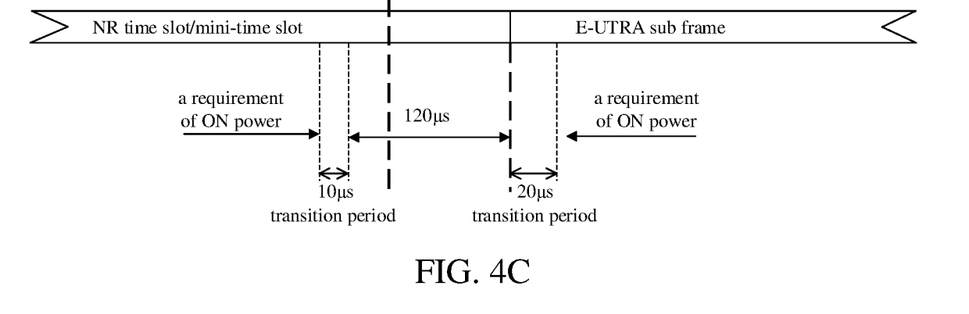
FIG. 4C is a schematic diagram of time domain positions of another switching time provided by an implementation of the present disclosure.
Figure 4D:
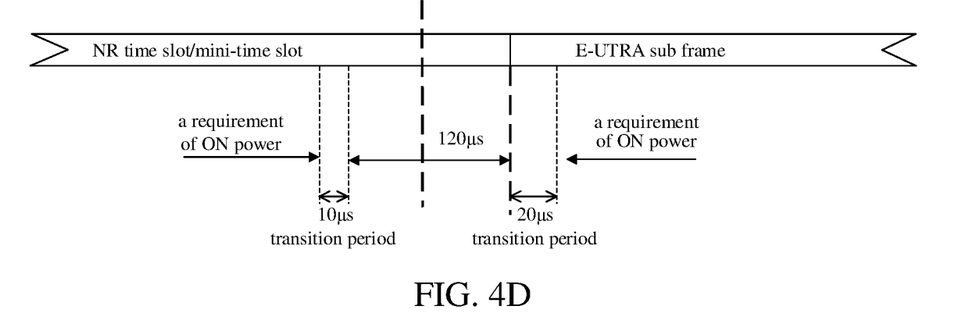
FIG. 4D is a schematic diagram of time domain positions of another switching time provided by an implementation of the present disclosure.

In other implementations, as shown in FIG. 4C, the time domain positions of the switching time are located in the first network and the second network according to a preset occupation ratio of time domain positions. For example, the time domain positions of the switching time are respectively located in the first network and the second network according to a ratio of a transition time of the first network to a transition time of the second network. If the ratio of the transition time of the first network to the transition time of the second network is 1:2, then a ratio of the switching time located in the first network to the switching time located in the second network is also 1:2. When the switching time is 30 µs, 10 µs is located in the first network and 20 µs is located in the second network. Or, the time domain positions of the switching time are located in the first network and the second network according to a preset occupation ratio. For another example, as shown in FIG. 4D, the time domain positions of the switching time are equally located in the first network and the second network. If the switching time is 20 µs, 10 µs is located in the first network and 10 µs is located in the second network.

In some implementations, the time domain positions of the switching time are determined according to an anchor network device. For example, when the anchor network device is located in the first network, the time domain positions of the switching time are located in the second network. Or, when the anchor network device is located in the second network, the time domain positions of the switching time are located in the first network.

Besides the above optional implementations, the time domain positions of the switching time are determined according to a frequency band range and/or a Sub-carrier Spacing (SCS).

It should be noted that the time domain positions of the switching time in implementations of the present disclosure may be applied flexibly or in combination according to the above manners. That is, the time domain positions of the switching time may be determined in one of the manners, or the time domain positions of the switching time may be determined by a combination of at least two manners.

In implementations of the present disclosure, the network device may flexibly determine the time domain positions of the switching time based on different switching times and a dual connection mode (EN-DC or NE-DC) of the terminal device, thereby improving a flexibility of the time domain positions of the switching time. Compared with that the switching times all occupy time domain positions of the NR network in related arts, performance of an NR system is enhanced.

An implementation of the present disclosure further includes:

Act S203, the terminal device acquires a scheduling of the terminal device performed by the network device.

Figure 5A:
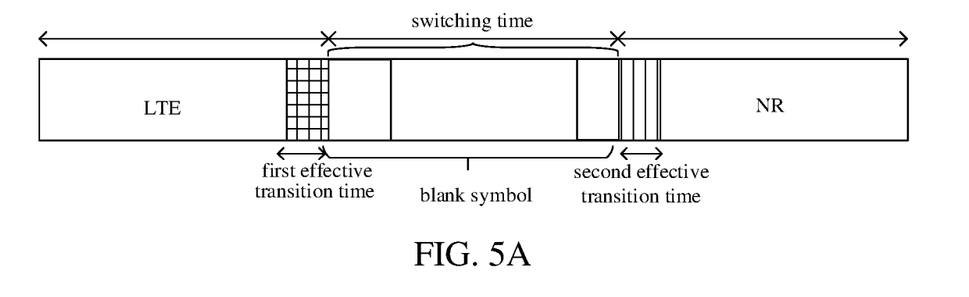
FIG. 5A is a schematic diagram of a scheduling behavior of a terminal device provided by an implementation of the present disclosure.

In some implementations, as shown in FIG. 5A, the scheduling includes: the terminal device does not transmit data within the switching time. At this time, there is a blank symbol within the switching time.

In other implementations, the scheduling includes: when a total transition time is greater than a size of one symbol or one sub time slot, the terminal device transmits data within the switching time, and when the total transition time is less than or equal to the size of one symbol or one sub time slot, the terminal device does not transmit the data within the switching time, wherein the one symbol and the one sub time slot pertain to the first network, or the one symbol and the one sub time slot pertain to the second network. When data is transmitted within the switching time, there is an opportunistic transmission symbol within the switching time.

Figure 5B:
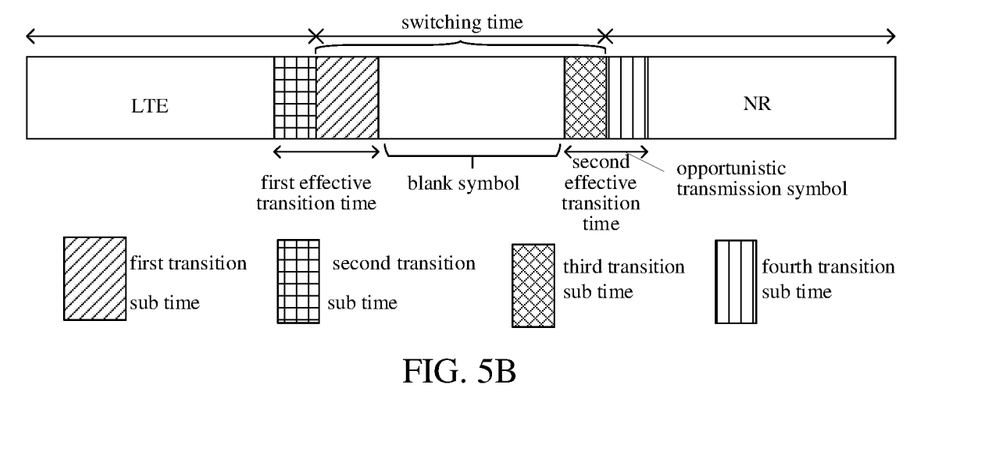
FIG. 5B is a schematic diagram of another scheduling behavior of a terminal device provided by an implementation of the present disclosure.

In other implementations, as shown in FIG. 5B, the scheduling includes: when the switching time is located in both the first network and the second network, and the switching time in the second network is greater than the transition time of the second network, the terminal device transmits the data within the switching time. When the switching time in the second network is less than the transition time of the second network, the terminal device does not transmit the data within the switching time.

Figure 5C:
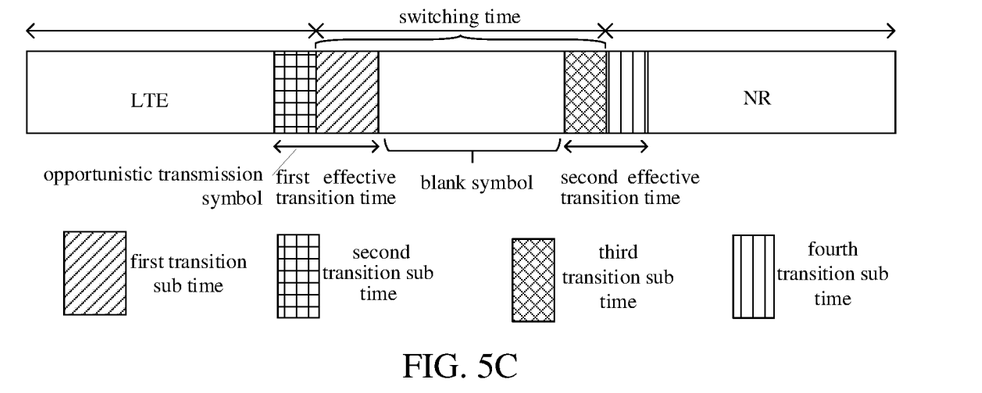
FIG. 5C is a schematic diagram of another scheduling behavior of a terminal device provided by an implementation of the present disclosure.

In some other implementations, as shown in FIG. 5C, the scheduling includes: when the switching time is located in both the first network and the second network, and the switching time in the first network is greater than the transition time of the first network, the terminal device transmits the data within the switching time, and when the switching time in the first network is less than the transition time of the first network, the terminal device does not transmit the data within the switching time.

In an implementation of the present disclosure, a total transition time is a sum of the switching time, the first transition time of the terminal device in the first network and the second transition time of the terminal device in the second network. Here, the total transition time is applicable to the terminal device having the second type of switching time capability, the third type of switching time capability and the fourth type of switching time capability in the above implementations of the present disclosure.

Or, the total transition time is a sum of a first time, the first transition time of the terminal device in the first network and the second transition time of the terminal device in the second network, wherein the first time is a part of the switching time. Here, the total transition time is applicable to the terminal device having the second type of switching time capability, the third type of switching time capability and the fourth type of switching time capability in the above implementations of the present disclosure.

Or, the total transition time is a sum of the first transition time of the terminal device in the first network and the second transition time of the terminal device in the second network. Here, the total transition time is applicable to the terminal device having the first type of switching time capability in the above implementations of the present disclosure.

Still taking FIG. 5C as an example, when a first effective transition time of the first network is greater than the size of one symbol or one sub time slot in the first network, the terminal device transmits the data within the first effective transition time of the first network. When the first effective transition time of the first network is less than the size of one symbol or one sub-time slot in the first network, the terminal device does not transmit the data within the first effective transition time of the first network. The first effective transition time of the first network includes at least a part of the switching time. In FIG. 5C, a first transition sub-time is time used for transmitting data within the switching time, and a second transition sub-time is time used for a power adjustment of the first network. When the terminal device transmits the data within the first effective transition time of the first network, the first effective transition time of the first network is equal to a sum of the first transition sub-time and the second transition sub-time.

Still taking FIG. 5B as an example, when a second effective transition time of the second network is greater than the size of one symbol or one sub time slot in the second network, the terminal device transmits the data within the second effective transition time of the second network. When the second effective transition time of the second network is less than the size of one symbol or one sub time slot in the second network, the terminal device does not transmit the data within the effective transition time of the second network. The second effective transition time of the second network includes at least a part of the switching time. In FIG. 5B, a third transition sub-time is time used for transmitting data within the switching time, and a fourth transition sub-time is time used for a power adjustment of the first network. When the terminal device transmits the data within the second effective transition time of the second network, the second effective transition time of the second network is equal to a sum of the third transition sub-time and the fourth transition sub-time.

In an implementation of the present disclosure, the scheduling further includes: when the switching time in the first network is greater than the transition time of the first network, the terminal device transmits the data within the switching time. When the switching time in the first network is less than the transition time of the first network, the terminal device does not transmit the data within the switching time.

The scheduling further includes: when the switching time in the second network is greater than the transition time of the second network, the terminal device transmits the data within the switching time. When the switching time in the second network is less than the transition time of the second network, the terminal device does not transmit the data within the switching time.

Taking FIG. 4A, FIG. 4B and FIG. 4C as examples of the switching time in the first network and the switching time in the second network, in FIG. 4A, 120 μs is the switching time in the first network. In FIG. 4B, 120 μs is the switching time in the second network. In FIG. 4C, 40 μs is the switching time in the first network and 80 μs is the switching time in the second network.

In an implementation of the present disclosure, the first network is an LTE network and the second network is an NR network.

In an implementation of the present disclosure, when the network device schedules the terminal device to perform the data transmission within the switching time, opportunities for transmission are increased, thereby a waste of network resources is avoided, and an efficiency of the data transmission is improved.

Figure 6:
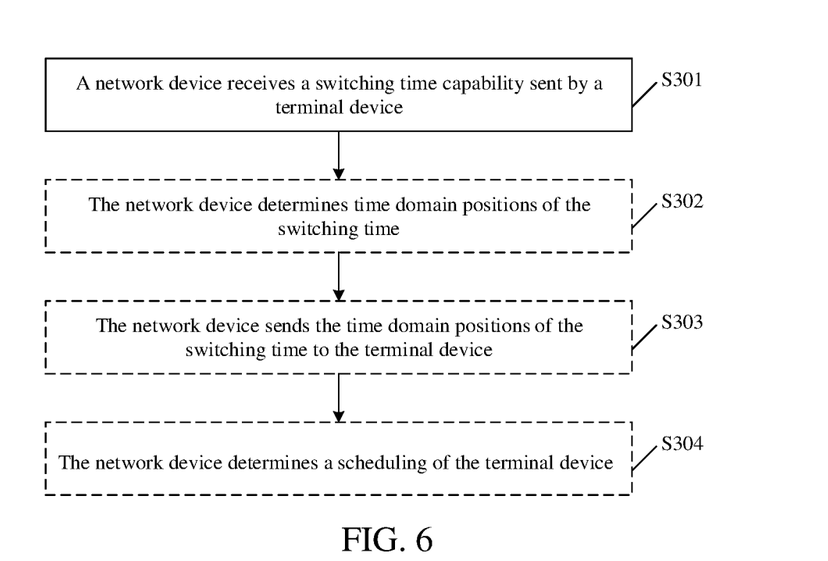
FIG. 6 is a schematic diagram of an optional processing flow of a data processing method applied to a network device provided by an implementation of the present disclosure.

As shown in FIG. 6, an implementation of the present disclosure further provides an optional processing flow of a data processing method applied to a network device, including following acts:

Act S301, a network device receives a switching time capability sent by a terminal device.

In an implementation of the present disclosure, the switching time capability is used for the network device to perform a data scheduling of the terminal device. A description of the switching time capability is the same as the description of the switching time capability in the above implementations, which will not be repeated here.

The Method Further Includes:

Act S302, the network device determines time domain positions of a switching time.

In some implementations, the network device determines that the time domain positions of the switching time are all located in the first network.

In some other implementations, the network device determines that the time domain positions of the switching time are all located in the second network.

In some other implementations, the network device determines that the time domain positions of the switching time are located in the first network and the second network according to a preset occupation ratio of time domain positions. For example, the time domain positions of the switching time are equally located in the first network and the second network. Or, the time domain positions of the switching time are respectively located in the first network and the second network respectively according to a ratio of transition time of the first network to transition time of the second network.

In some implementations, the time domain positions of the switching time are determined according to an anchor network device. For example, when the anchor network device is located in the first network, the time domain positions of the switching time are located in the second network. Or, when the anchor network device is located in the second network, the time domain positions of the switching time are located in the first network.

Besides the above optional implementations, the time domain positions of the switching time are determined according to a frequency band range and/or SCS.

Act S303, the network device sends the time domain positions of the switching time to the terminal device.

Act S304, the network device determines a scheduling of the terminal device.

It should be noted that, in the implementation of the present disclosure, a description on the scheduling is the same as the description on the scheduling in act S203 above, which will not be repeated here.

Figure 7:
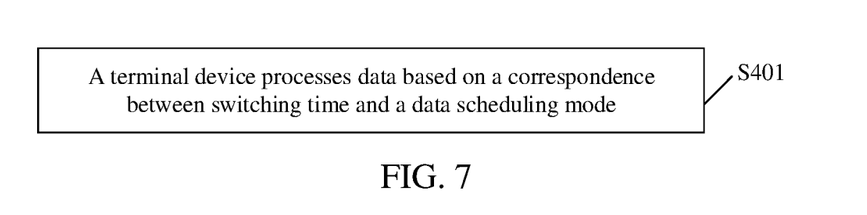
FIG. 7 is a schematic diagram of an optional processing flow of another data processing method applied to a terminal device provided by an implementation of the present disclosure.

As shown in FIG. 7, an implementation of the present disclosure further provides another data processing method applied to a terminal device, including:

Act S401, a terminal device processes data based on a correspondence between a switching time and a data scheduling mode.

Here, the processing of data includes: transmitting the data within the switching time or not transmitting the data within the switching time.

In some implementations, a correspondence between the switching time and the data scheduling mode is pre-configured, or the correspondence between the switching time and the data scheduling mode is determined by a negotiation between the terminal device and the network device. For example, switching times include a, b and c, and data scheduling modes corresponding to the switching times are A, B and C respectively. Then, when the terminal device determines that its own switching time is a, the terminal device does not report the switching time to the network device, but determines that the data scheduling mode corresponding to the switching time a is A according to the correspondence between the switching time and the data scheduling mode, and performs data processing according to A. When the data scheduling mode A indicates that there is an opportunity to transmit symbols in the switching time, the terminal device transmits data in the switching time. When the data scheduling mode A indicates that there is no opportunity to transmit symbols within the switching time, the terminal device does not transmit the data within the switching time.

Figure 8:
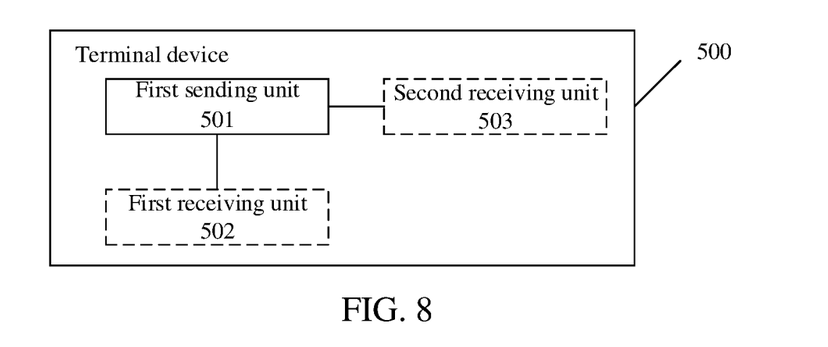
FIG. 8 is a structural schematic diagram of a terminal device provided by an implementation of the present disclosure.

An implementation of the present disclosure further provides a terminal device. As shown in FIG. 8, constituent structures of the terminal device 500 include:

a first sending unit 501, configured to report a switching time capability to a network device, wherein the switching time capability is used for the network device to perform a data scheduling on the terminal device, the switching time capability includes the switching time from a first network to a second network for the terminal device, and/or the switching time from the second network to the first network for the terminal device.

In an implementation of the present disclosure, the first sending unit 501 is configured to report to the network device an identifier in a switching time set corresponding to the switching time. The switching time set includes at least two switching times, and the switching time set is an increasing sequence.

In an implementation of the present disclosure, the first sending unit 501 is configured to send indication information of switching time capability type to the network device, wherein a bit value of the indication information of switching time capability type is used for representing a type of the switching time capability.

In an implementation of the present disclosure, the switching time capability types include: a first type of switching time capability, a second type of switching time capability, a third type of switching time capability and a fourth type of switching time capability. A maximum switching time corresponding to the first type of switching time capability is less than a first threshold. A maximum switching time corresponding to the second type of switching time capability is less than a second threshold. A maximum switching time corresponding to the third type of switching time capability is less than a third threshold. A maximum switching time corresponding to the fourth type of switching time capability is greater than the third threshold. In the above, the first threshold is 0.5 μs, the second threshold is 20 μs, and the third threshold is 120 μs.

In an implementation of the present disclosure, the first sending unit 501 is configured to send the switching time to the network device.

In an implementation of the present disclosure, the terminal device 500 further includes: a first receiving unit 502, configured to acquire the time domain positions of the switching time sent by the network device.

In an implementation of the present disclosure, the time domain positions of the switching time are all located in the first network. Or, the time domain positions of the switching time are all located in the second network. Or, the switching time is located in the first network and the second network according to a preset occupation ratio of time domain positions. Or, when an anchor network device is located in the first network, the time domain positions of the switching time are located in the second network. Or, when the anchor network device is located in the second network, the time domain positions of the switching time are located in the first network. Or, the time domain positions of the switching time are equally located in the first network and the second network. Or, the time domain positions of the switching time are determined according to a frequency band range and/or SCS.

In an implementation of the present disclosure, the terminal device 500 further includes: a second receiving unit 503, configured to acquire a scheduling of the terminal device performed by the network device.

It should be noted that, in the implementation of the present disclosure, a description on the scheduling is the same as the description on the scheduling in act S203 above, which will not be repeated here.

In an implementation of the present disclosure, a description on a total transition time is the same as the description on the total transition time in act S203 in above implementations, which will not be repeated here.

Figure 9:
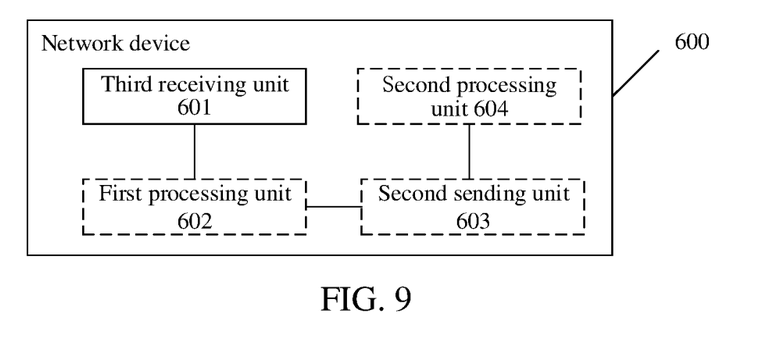
FIG. 9 is a structural schematic diagram of a network device provided by an implementation of the present disclosure.

An implementation of the present disclosure further provides a network device. As shown in FIG. 9, constituent structures of the network device 600 include:

a third receiving unit 601, configured to receive a switching time capability sent by a terminal device, wherein the switching time capability is used by the network device to perform a data scheduling on the terminal device, wherein the switching time capability includes: switching time from a first network to a second network for the terminal device, and/or switching time from the second network to the first network for the terminal device.

In an implementation of the present disclosure, the third receiving unit 601 is configured to receive an identifier in a switching time set corresponding to the switching time sent by the network device. The switching time set includes at least two switching times, and the switching time set is an increasing sequence.

In an implementation of the present disclosure, the third receiving unit 601 is configured to receive indication information of switching time capability type sent by the terminal device, wherein a bit value of the indication information of switching time capability type is used for representing a type of the switching time capability.

In an implementation of the present disclosure, the switching time capability types include: a first type of switching time capability, a second type of switching time capability, a third type of switching time capability and a fourth type of switching time capability. A maximum switching time corresponding to the first type of switching time capability is less than a first threshold. A maximum switching time corresponding to the second type of switching time capability is less than a second threshold. A maximum switching time corresponding to the third type of switching time capability is less than a third threshold. A maximum switching time corresponding to the fourth switching time capability is greater than the third threshold. In the above, the first threshold is 0.5 µs, the second threshold is 20 µs, and the third threshold is 120 µs.

In an implementation of the present disclosure, the third receiving unit 601 is configured to receive the switching time sent by the terminal device.

In an implementation of the present disclosure, the network device 600 further includes: a first processing unit 602, configured to determine time domain positions of the switching time.

In an implementation of the present disclosure, the first processing unit 602 is configured to determine the time domain positions of the switching time based on a dual connection (DC) mode supported by the terminal device and the switching time.

In an implementation of the present disclosure, the time domain positions of the switching time are all located in the first network. Or, the time domain positions of the switching time are all located in the second network. Or, the switching times are located in the first network and the second network according to a preset occupation ratio of time domain positions. Or, the time domain positions of the switching time are determined according to an anchor network device. When the anchor network device is located in the first network, the time domain positions of the switching time are located in the second network. Or, when the anchor network device is located in the second network, the time domain positions of the switching time are located in the first network. Or, the time domain positions of the switching time are equally located in the first network and the second network. Or, the time domain positions of the switching time are determined according to a frequency band range and/or SCS.

In an implementation of the present disclosure, the network device further includes: a second sending unit 603, configured to send the time domain positions of the switching time to the terminal device.

In an implementation of the present disclosure, the network device further includes: a second processing unit 604, configured to determine a scheduling of the terminal device.

It should be noted that, in the implementation of the present disclosure, a description on the scheduling is the same as the description on the scheduling in act S203 above, which will not be repeated here.

Figure 10:
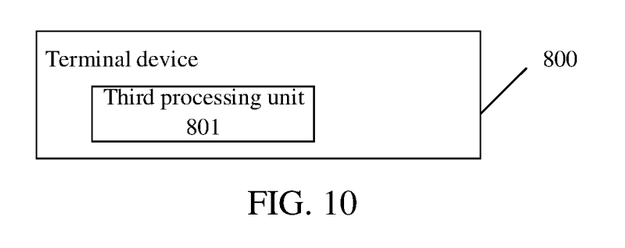
FIG. 10 is a structural schematic diagram of another terminal device provided by an implementation of the present disclosure.

An implementation of the present disclosure further provides another terminal device. As shown in FIG. 10, constituent structures of the terminal device 800 include:

a third processing unit 801, configured to process data based on a correspondence between switching time and a data scheduling mode. The processing of data includes: transmitting data or not transmitting data within the switching time.

In an implementation of the present disclosure, the third processing unit 801 is configured to determine according to its own switching time, corresponding data scheduling mode in the correspondence between the switching time and the data scheduling mode, and process the data based on the determined data scheduling mode.

In an implementation of the present disclosure, the correspondence between the switching time and the data scheduling mode is pre-configured. Or, the correspondence between the switching time and the data scheduling mode is determined by a negotiation between the terminal device and the network device.

In an implementation of the present disclosure, the data scheduling mode includes at least one of following: the terminal device transmits the data within the switching time; and the terminal device does not transmit the data within the switching time.

An implementation of the present disclosure further provides a terminal device, including a processor and a memory configured to store a computer program which is runnable on the processor, wherein the processor is configured to execute acts of above methods executed by the terminal device when running the computer program.

An implementation of the present disclosure provides a network device, including a processor and a memory configured to store a computer program that is runnable on the processor, wherein the processor is configured to execute acts of above methods executed by the network device when running the computer program.

Figure 11:
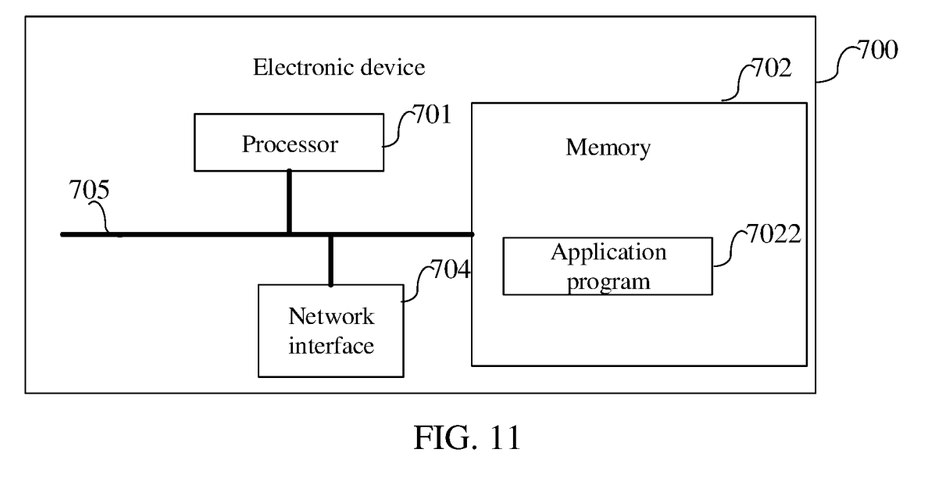
FIG. 11 is a structural schematic diagram of hardware of an electronic device provided by an implementation of the present disclosure.

FIG. 11 is a structural schematic diagram of hardware of an electronic device (network device or terminal device) of an implementation of the present disclosure. The electronic device 700 includes: at least one processor 701, a memory 702 and at least one network interface 704. Various components in the electronic device 700 are coupled together by a bus system 705. It may be understood that the bus system 705 is configured to implement a connection and a communication between these components. In addition to a data bus, the bus system 705 includes further a power bus, a control bus, and a status signal bus. However, for sake of clarity, all types of buses are uniformly referred to as a bus system 705 in FIG. 11.

It may be understood that the memory 702 may be a volatile memory and/or a nonvolatile memory. The nonvolatile memory may be a ROM, a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The volatile memory may be a Random Access Memory (RAM) which serves as an external cache. By way of exemplary but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM). The memory 702 described in implementations of the present disclosure is intended to include, but is not limited to, these and any other suitable types of memories.

The memory 702 in implementations of the present disclosure is configured to store various types of data to support operations of the electronic device 700. Examples of such data include any computer program used for operating on the electronic device 700, such as an application program 7022. A program for implementing methods of implementations of the present disclosure may be included in the application program 7022.

Methods disclosed in the above implementations of the present disclosure may be applied in the processor 701 or implemented by the processor 701. The processor 701 may be an integrated circuit chip with a signal processing capability. In an implementation process, each act of the above methods may be accomplished by integrated logic circuits of hardware in the processor 701 or instructions in a form of software. The processor 701 may be a general-purpose processor, a Digital Signal Processor (DSP), or other programmable logic devices, a discrete gate or a transistor logic device, a discrete hardware component, etc. The processor 701 may implement or execute various methods, acts and logical block diagrams disclosed in implementations of the present disclosure. The general purpose processor may be a microprocessor or any conventional processor, etc. Acts of the methods disclosed in combination with implementations of the present disclosure may be directly embodied as being executed and accomplished by a hardware decoding processor or by a combination of hardware and software modules in a decoding processor. The software module may be located in a storage medium, and the storage medium is located in the memory 702. The processor 701 reads information in the memory 702 and accomplishes acts of aforementioned methods in combination with hardware thereof.

An implementation of the present application further provides a computer readable storage medium configured to store a computer program.

Optionally, the computer readable storage medium may be applied to a network device of an implementation of the present application, and the computer program causes a computer to perform corresponding processes implemented by the network device in various methods of implementations of the present application, which will not be repeated here for sake of brevity. Optionally, the computer readable storage medium may be applied to a terminal device of an implementation of the present application, and the computer program causes the computer to perform corresponding processes implemented by the terminal device in various methods of implementations of the present application, which will not be repeated here for sake of brevity.

The present disclosure is described with reference to flowcharts and/or block diagrams of methods, devices (systems), and computer program products according to implementations of the present disclosure. It should be understood that each flow and/or block in a flowchart and/or block diagram, and combinations of flows and/or blocks in the flowchart and/or block diagram may be implemented by computer program instructions. These computer program instructions may be provided to a processor of a general purpose computer, a special purpose computer, an embedded processor or other programmable data processing apparatus to produce a machine, such that the instructions which are executed by the processor of the computer or other programmable data processing apparatus produce devices for implementing the functions specified in one or more flow of the flow charts and/or one or more block of the block diagrams.

These computer program instructions may also be stored in a computer-readable memory that may direct a computer or other programmable data processing apparatus to operate in a specific manner, such that the instructions stored in the computer-readable memory produce an article of manufacture including instruction means that implement the functions specified in one or more flows of a flowchart and/or one or more blocks of a block diagram.

These computer program instructions may also be loaded onto a computer or other programmable data processing device, such that a series of operational acts are performed on the computer or other programmable device to produce a computer-implemented process, such that the instructions executed on the computer or other programmable device provide acts for implementing functions specified in one or more flow of flow diagrams and/or one or more block of block diagrams.

The above descriptions are only preferred implementations of the present disclosure and are not intended to limit the protection scope of the present disclosure. Any modification, equivalent substitution, improvement, etc. made within the spirit and principles of the present disclosure shall be covered by the protection scope of the present disclosure.

What is claimed is:
1. A data processing method, comprising:
reporting, by a terminal device, a switching time capability to a network device,
wherein the switching time capability is used for data scheduling of the terminal device performed by the network device for uplink transmission channels;
wherein the terminal device supports dual connection (DC), and the switching time capability comprises switching time from a first network to a second network for the terminal device, and/or switching time from the second network to the first network for the terminal device, and the network device comprises a first network device and/or a second network device; wherein one of the first network and the second network is Evolved Universal Terrestrial Radio Access (E-UTRA) network and the other is

New Radio (NR) network; wherein no data is transmitted by the terminal device within the switching time, wherein the method further comprises:

acquiring, by the terminal device, time domain positions of the switching time sent by the network device, wherein the time domain positions of the switching time are all located in the second network.

2. The method of claim 1, wherein the reporting by the terminal device the switching time capability to the network device comprises:

reporting, by the terminal device, an identifier in a switching time set corresponding to the switching time to the network device.

3. The method of claim 2, wherein the switching time set comprises at least two switching times.

4. The method of claim 3, wherein any one of the at least two switching times corresponds to one switching time capability.

5. The method of claim 1, wherein the time domain positions of the switching time are determined according to an anchor network device;

wherein when the anchor network device is located in the first network, the time domain positions of the switching time are located in the second network; or when the anchor network device is located in the second network, the time domain positions of the switching time are located in the first network.

6. The method of claim 1, further comprising:

acquiring, by the terminal device, the configuration of the terminal device performed by the network device;

wherein the configuration comprises:

when the switching time in the first network is less than the transition time of the first network, the terminal device does not transmit the data within the switching time.

7. A data processing method, comprising:

receiving, by the network device, a switching time capability sent by a terminal device, wherein the switching time capability is used by the network device to perform a data scheduling on the terminal device for uplink transmission channels;

wherein the terminal device supports dual connection (DC), and the switching time capability comprises:

switching time from a first network to a second network for the terminal device, and/or switching time from the second network to the first network for the terminal device wherein one of the first network and the second network is Evolved Universal Terrestrial Radio Access (E-UTRA) network and the other is New Radio (NR) network; wherein no data is transmitted by the terminal device within the switching time, wherein the method further comprises:

determining, by the network device, time domain positions of the switching time sent by the network device, wherein the time domain positions of the switching time are all located in the second network.

8. The method of claim 7, wherein the receiving by the network device the switching time capability sent by the terminal device comprises:

receiving, by the network device, an identifier in a switching time set corresponding to the switching time sent by the network device.

9. The method of claim 8, wherein the switching time set comprises at least two switching times.

10. The method of claim 7, wherein the time domain positions of the switching time are determined according to an anchor network device;

wherein when the anchor network device is located in the first network, the time domain positions of the switching time are located in the second network; or when the anchor network device is located in the second network, the time domain positions of the switching time are located in the first network.

11. The method of claim 7, further comprising:

determining, by the network device, the configuration of the terminal device;

wherein the configuration comprises:

when the switching time in the first network is less than the transition time of the first network, the terminal device does not transmit the data within the switching time.

12. A network device, comprising:

a processor, a memory and at least one network interface, which are coupled together by a bus system, the memory is configured to store a computer program which is runnable on the processor, when running the computer program, the processor is configured to:

receive a switching time capability sent by a terminal device, wherein the switching time capability is used by the network device to perform a data scheduling on the terminal device for uplink transmission channels;

wherein the terminal device supports dual connection (DC), and the switching time capability comprises: switching time from a first network to a second network for the terminal device, and/or switching time from the second network to the first network for the terminal device; wherein one of the first network and the second network is Evolved Universal Terrestrial Radio Access (E-UTRA) network and the other is New Radio (NR) network; wherein no data is transmitted by the terminal device within the switching time, wherein the processor is further configured to:

determine time domain positions of the switching time sent by the network device wherein the time domain positions of the switching time are all located in the second network.

13. The method of claim 12, wherein the processor is configured to:

receive an identifier in a switching time set corresponding to the switching time sent by the network device.

14. The method of claim 13, wherein the switching time set comprises at least two switching times.

* * * * *